(12) United States Patent
Blach et al.

(10) Patent No.: US 7,025,491 B2
(45) Date of Patent: Apr. 11, 2006

(54) HOMOGENIZING AND/OR DISPERSING DEVICE COMPRISING ENDLESS SCREWS

(75) Inventors: Josef A. Blach, Lauffen (DE); Markus Blach, Lauffen (DE); Michael Blach, Lauffen (DE)

(73) Assignee: 3+Extruder GmbH, Lauffen (DE)

( * ) Notice: Subject to any disclaimer, the term of this patent is extended or adjusted under 35 U.S.C. 154(b) by 110 days.

(21) Appl. No.: 10/477,442

(22) PCT Filed: May 8, 2002

(86) PCT No.: PCT/EP02/05100

§ 371 (c)(1),
(2), (4) Date: Nov. 7, 2003

(87) PCT Pub. No.: WO02/090087

PCT Pub. Date: Nov. 14, 2002

(65) Prior Publication Data

US 2004/0141405 A1   Jul. 22, 2004

(30) Foreign Application Priority Data

May 9, 2001   (DE) ................................ 101 22 462

(51) Int. Cl.
*B29B 7/42* (2006.01)
*B29B 7/48* (2006.01)
(52) U.S. Cl. .......................... 366/85; 366/88; 425/208; 425/209
(58) Field of Classification Search ................. 366/83, 366/84, 85, 88; 425/204, 208, 209
See application file for complete search history.

(56) References Cited

U.S. PATENT DOCUMENTS

| | | | | | |
|---|---|---|---|---|---|
| 1,359,296 | A | * | 10/1920 | La Casse | 366/76.4 |
| 2,508,495 | A | * | 5/1950 | Gabriel | 366/85 |
| 2,550,226 | A | * | 4/1951 | Colombo | 366/85 |
| 2,581,451 | A | * | 1/1952 | Morgan | 366/85 |
| 2,802,238 | A | * | 8/1957 | Colombo | 366/85 |
| 2,968,836 | A | * | 1/1961 | Colombo | 366/75 |
| 3,310,837 | A | * | 3/1967 | Ludwig | 366/76.1 |
| 3,525,124 | A | * | 8/1970 | Ocker | 425/204 |
| 3,640,669 | A | * | 2/1972 | Hanslik | 425/376.1 |
| 3,746,319 | A | * | 7/1973 | Blach | 366/81 |

(Continued)

FOREIGN PATENT DOCUMENTS

DE   813 154   9/1951

(Continued)

OTHER PUBLICATIONS

Verified English translation of Description and Claims of European Patent No. 0 422 272, published Apr. 17, 1991 (7 pages).

*Primary Examiner*—Tony G. Soohoo
(74) *Attorney, Agent, or Firm*—Flynn, Thiel, Boutell & Tanis, P.C.

(57) ABSTRACT

An apparatus for homogenizing and/or dispersing at least one viscous substance and at least one solid and/or at least one other substance of different viscosity includes in a space in a housing axis-parallel rotatable shafts disposed along a circle with equal central-angle distance and provided with tightly intermeshing screw elements. The shafts in the area outside the openings in the housing are provided with screw elements having a pitch (S) of at most three quarters of the outside screw diameter (D) over a length (L=L1+L2+L3) corresponding to at least ten times the outside diameter (D) of the screw elements.

18 Claims, 6 Drawing Sheets

U.S. PATENT DOCUMENTS

| | | | |
|---|---|---|---|
| 3,929,322 A * | 12/1975 | Hanslik | 366/85 |
| 4,040,607 A * | 8/1977 | Ullrich | 366/85 |
| 4,162,854 A * | 7/1979 | Ullrich | 366/83 |
| 4,192,617 A * | 3/1980 | Spielhoff | 366/83 |
| 4,268,176 A * | 5/1981 | Muller | 366/83 |
| 5,393,140 A | 2/1995 | Blach | |
| 5,429,435 A * | 7/1995 | Blach | 366/83 |
| 5,476,319 A * | 12/1995 | Blach | 366/83 |
| 5,510,073 A * | 4/1996 | Kaegi et al. | 264/211.23 |
| 5,836,682 A * | 11/1998 | Blach | 366/84 |
| 6,190,031 B1 | 2/2001 | Blach et al. | |
| 6,196,711 B1 | 3/2001 | Blach et al. | |
| 2005/0105382 A1 * | 5/2005 | Sturm et al. | 366/85 |

FOREIGN PATENT DOCUMENTS

| | | |
|---|---|---|
| DE | 28 54 207 | 6/1980 |
| DE | 196 07 663 A | 9/1997 |
| DE | 198 54 689 A | 6/2000 |
| EP | 0 002 131 A | 5/1979 |
| EP | 0 422 272 A1 | 4/1991 |
| EP | 0 788 867 A | 8/1997 |

* cited by examiner

HOMOGENIZING AND/OR DISPERSING DEVICE COMPRISING ENDLESS SCREWS

FIELD OF THE INVENTION

This invention relates to an apparatus for homogenizing and/or dispersing at least one viscous substance and at least one solid and/or at least one other substance of different viscosity.

BACKGROUND OF THE INVENTION

Screw extruders have the disadvantage of frequently obtaining poorer qualitative results when homogenizing, kneading and dispersing solids in a viscous matrix or homogenizing substances of very different viscosity than with batchwise kneading. This also applies to twin screw extruders. To improve homogenization, the two shafts of twin screw extruders are therefore generally provided not only with screw elements but also with rotationally fast so-called kneading blocks which consist of two or more disk cams mutually offset at an angle in the circumferential direction and with a contour formed of a plurality of circular arcs. Such kneading blocks are described for example in DE 813 154 B and EP 0 422 272 B1.

Further, EP 0 788 867 B1 discloses an apparatus for continuous processing of flowable materials. In this apparatus, homogenization is also effected substantially by kneading blocks. Kneading blocks have the disadvantage, however, that low energies are conducted into the product to be processed in the deep channel center while very high energies are conducted in the channel tapering in a wedge shape to the housing, which can lead not only to a specifically high energy consumption but also to partial overstressing of the product and high wear in the area of the kneading block and housing. Moreover, the axially open construction of the kneading blocks can cause product fractions to pass through the kneading blocks easily on a short path and without energy consumption, i.e. without homogenization.

DE 28 54 207 B2 discloses a screw extruder having a mixing zone with a length of 4–12 D (D=outside diameter of a screw element), the pitches being between 0.5 to 2 D in the feed zone and 0.3–1 D in the discharge zone.

The problem of the invention is to state the requirements for the design of a generic apparatus for perfect homogenization and/or dispersion.

SUMMARY OF THE INVENTION

This is obtained according to the invention by the apparatus characterized in claim 1. The subclaims render advantageous embodiments of the invention.

The inventive apparatus has in a space between a housing and an inside core along a circle with equal central-angle distance at least three axis-parallel rotatable shafts provided at least partly with tightly intermeshing screw elements. The housing is provided on its inside and the inside core on its outside with axis-parallel concave circular segments that receive the particular shaft with the screw elements.

The circle on which the shafts are disposed is a circular arc or can be a full circle, so that the process space can be disposed around the circular arc or is annular. The housing and/or inside core is provided with openings, for example material supply openings and/or material and/or gas outlet openings.

Since the screw elements in such an apparatus have a distinctly reduced homogenizing or dispersing effect in the area where the housing and/or inside core has openings, the axial area located outside said openings must have a length corresponding to at least ten times, preferably fifteen times, the outside diameter of the screw elements according to the invention.

This length also relates only to the area where the viscous substance is present in a 100% melted or liquid state. That is, the screw length necessary for melting is not included in the inventive process part.

The same holds when substances of different viscosity are homogenized with the inventive apparatus and at least one of said substances must first be melted in the apparatus. Then, too, the length of the screw elements on the shafts outside the openings provided in the housing and/or inside core must be at least ten times, preferably fifteen times, the outside screw diameter, namely in the area where all substances are liquid or melted.

The length where the solids content in the liquid, i.e. possibly melted, substance or, upon homogenization of substances of different viscosity, all substances to be homogenized are present in a liquid, i.e. possibly melted, state in the apparatus and that is located outside said openings can also be designated the process length. That is, the shafts are provided with screw elements over a process length corresponding to at least ten times, preferably at least fifteen times, the outside screw diameter according to the invention.

Moreover, the screw elements of which the process length is composed have a pitch of at most three quarters, preferably at most two thirds and especially preferably at most half, the outside screw diameter over a length corresponding to at least three times, preferably at least five times, the outside screw diameter in order to obtain the desired dispersion and homogenization.

When these conditions are met, solids in a viscous matrix can be dispersed or homogenized continuously with the inventive apparatus with such an outstanding result as could hitherto be attained only batchwise with kneaders. The same applies to the homogenization of substances of different viscosity.

This is because under these conditions the number of zones where adjacent screw elements intermesh, i.e. the lands or flights of adjacent screw elements overlap, is multiplied.

In a twin screw extruder the number of transitions where the concave circular segments on one and the other side of the housing intersect on a housing cross section is altogether two, in an apparatus according to EP 0 788 867 B1 with three shafts the number of transitions where the concave circular segments on the inside of the housing and the outside of the inside core intersect is altogether four, and with twelve shafts in a closed circle altogether twenty-four.

In strictly mechanically terms, at one screw revolution twenty-four wedges are passed with the twelve shafts and two in the twin screw. If twenty turns with pitch=1×diameter are disposed over the partial process length of 20 Ø in each case, the number of passages per revolution increases to 20×24=480 with 12 shafts and to 2×20=40 in a twin screw.

In a three-shaft machine four wedges are simultaneously effective, which means that four wedges become effective per screw revolution, i.e. eighty wedge passages in case of twenty turns. Analogously the results are as follows at smaller pitches for a:

| | | |
|---|---|---|
| Twin screw pitch ¾ Ø | 53.3 | wedge passages |
| 3 shafts | 106.7 | wedge passages |
| 12 shafts | 640 | wedge passages |
| Twin screw with pitch ⅔ Ø | 60 | wedge passages |

-continued

| | | |
|---|---|---|
| 3 shafts | 120 | wedge passages |
| 12 shafts | 720 | wedge passages |
| Twin screw with pitch ½ Ø | 80 | wedge passages |
| 3 shafts | 160 | wedge passages |
| 12 shafts | 960 | wedge passages | where Ø is the outside screw diameter.

The effect of the intermeshing zones on the dispersion and homogenization of one or more solids or the other substance fractions in a viscous matrix is based substantially on the braking influence of the housing being substantially eliminated when material flows through the intermeshing zone, which simultaneously involves an increase in material speeds, and results in an extension of the involved material. Further, when material hits the outside diameter of the receiving screw flight that is rotating at circumferential speed, the material is removed from the screw surface of the delivering screw, reoriented and directed into the contracted cross section of the receiving screw with a new flow direction, as in plowing. Via the viscosity of the continuous phase, this causes traction and bending forces to be exerted on the moistened solid agglomerates, which can then break. Since the amount of stress is limited by the viscosity, single break and/or repeated break must take place with the passage of many tandem-mounted intermeshing zones over the duration of stressing. The screws act as a strict conveying and pressure buildup system over the circumferential length from intermeshing zone to intermeshing zone, as in a conventional single-shaft extruder.

That these processes play an essential part for homogenization and dispersion of the solid is to be inferred from the fact that even with solid particles having a particle size in the micron range in a viscous matrix the inventive apparatus obtains perfect dispersion and homogenization, which is in no way inferior to batchwise dispersion and homogenization in a kneader.

The same result can be achieved when homogenizing substances of different viscosity with the inventive apparatus.

The screws of the inventive apparatus are preferably of single- or double-flighted design. Single-flighted screw elements are especially preferred because the flight width can be selected to be large compared to the channel width, i.e. a high cross-sectional contraction of the screw channel can be obtained.

The screw profile of the inventive apparatus preferably consists of a plurality of circular arcs, whereby on the outside and inside the particular radius constitutes the curvature and for the flanks therebetween the center distance determines as the radius the maximum curvature.

$$Ax = D/2 + d/2$$

Ax Center distance of two screws
D Outside diameter
d Core diameter $$GZ(2\text{alpha} + \text{beta} + \text{gamma}) = 360°$$

GZ Number of channels
alpha Flank angle
beta Core angle
gamma Flight angle

In the standard version, beta=gamma is selected.

The maximum possible relations for D:d result from the abovementioned mathematical relations.

In the inventive apparatus a comminution of the solid particle agglomerates is thus effected in the transfer process of material from the delivering to the receiving screw through extension and bending (reorientation) of the viscous matrix, whereby the amount of stress to which the material is exposed can be influenced substantially by the number of intermeshing zones, the duration of stressing and via the flight width, the process engineering requirements can be influenced very finely by the mechanical variables.

Through the large screw surface involved in the processing operation and the small quantity of material in relation thereto, no partial overheating or other overloading of the material is to be expected in the inventive apparatus, but rather a uniform load in the intermeshing zones. Thus also results in uniform energy conversion throughout the material to be processed along with low wear of the screws. In addition there is the crucial advantage that axial bypassing of parts of the material stream is prevented, i.e. no escape is possible.

The inventive apparatus can be used to produce for example nonconductive plastics by dispersing and homogenizing carbon black with a quality that was hitherto hardly attainable with kneaders. Further, it can be used to homogenize and/or disperse or break up paints, fillers and foods such as chocolate. For example, it can produce the starting material required for spinning microfibers, i.e. a spinnable plastic to which coloring pigments or other solids are added in the micron or nano range. Said microfibers have a diameter that is only slightly greater than the diameter of the coloring pigments or other solid particles. If the solid aggregates are not finely dispersed and homogenized, the spinning jets will become clogged or the fibers tear during spinning. Further, the inventive apparatus can be used for example to produce the material for plastic foils or protective paints. Since the inventive apparatus is also suitable for homogenizing plastics with very different polymer chain lengths, it can also be used for example to modify bi- or multimodal plastics.

The shafts of the inventive apparatus can be driven in the same direction but can also be formed to turn in opposite directions.

BRIEF DESCRIPTION OF THE INVENTION

In the following, an embodiment of the inventive apparatus will be described in more detail with reference to the drawing, in which.

DETAILED DESCRIPTION OF THE INVENTION

Figure 1:
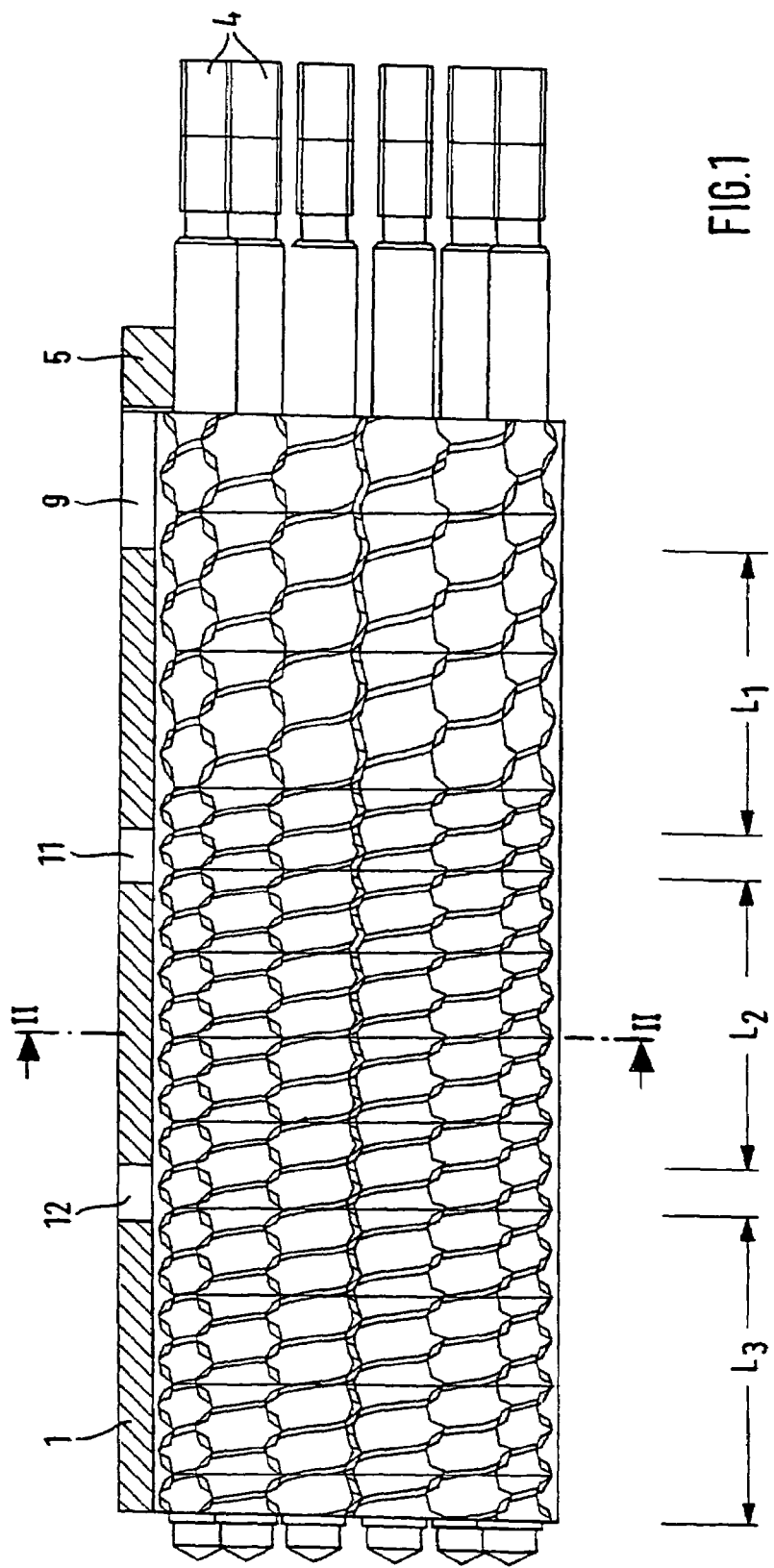
FIG. 1 shows a longitudinal section through the apparatus.
Figure 2:
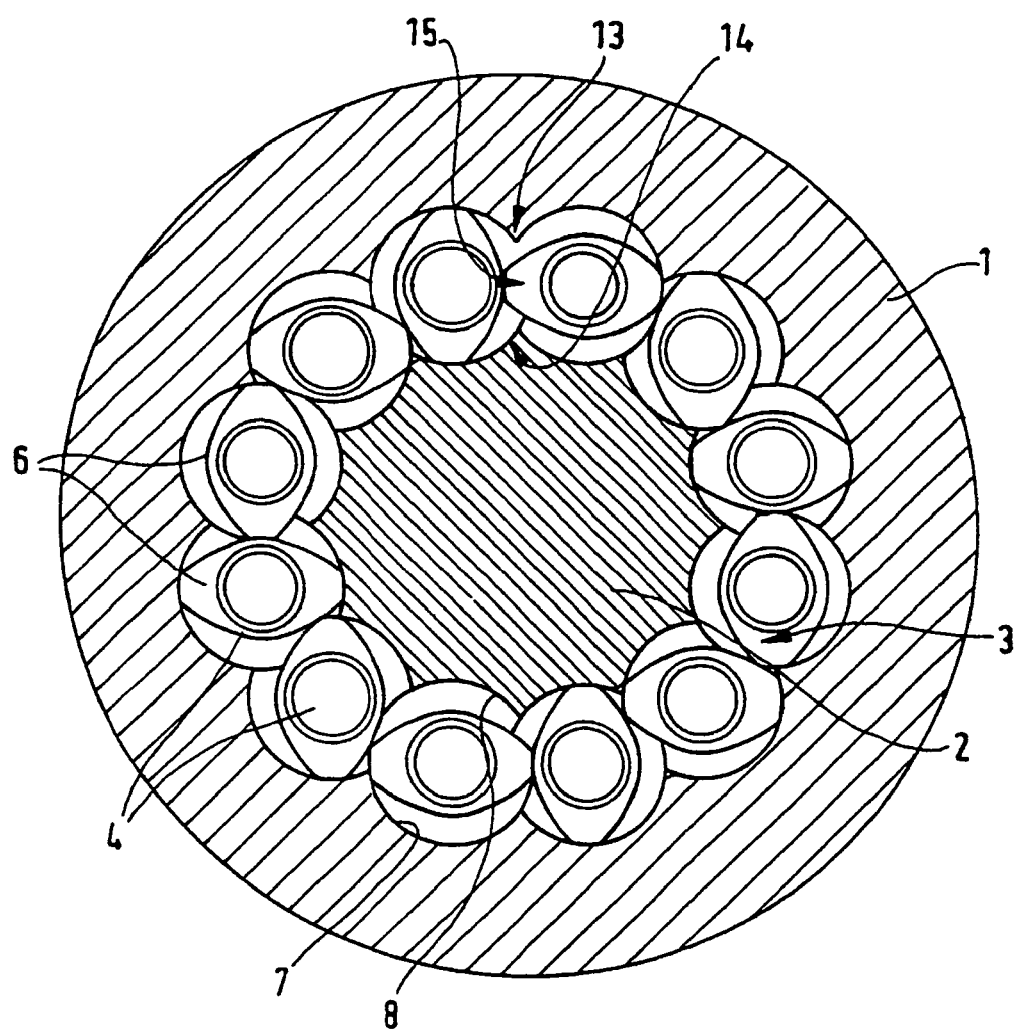
FIG. 2 shows a cross section of the apparatus along line II—II in FIG. 1.

According to FIGS. 1 and 2, the apparatus has housing 1 and axial inside core 2. Between housing 1 and inside core 2 there is annular screw space 3 with a plurality of axis-parallel disposed shafts 4.

Housing 1 is closed on the input side by end-plate 5 through which shafts 4 extend that are driven in the same direction or opposite directions by a gear (not shown). A plurality of double-flighted screw elements 6 are disposed rotationally fast on each shaft 4.

As indicated by FIG. 2, screw elements 6 of adjacent shafts 4 intermesh with little play, i.e. largely tightly.

Housing 1 is provided on the inside, and core 2 on its outside, with axis-parallel concave circular segments 7, 8. In cross section the inside of housing 1 and inside core 2 are thus formed in a rosette shape of concentric circular segments 7 and 8 whose center is located in the cylinder surface of the circle on which the axles of shafts 4 are located. Screw elements 6 mesh with circular segments 7, 8 with little play, i.e. largely tightly.

At the input-side end facing end-plate 5, housing 1 has opening 9 on the top through which material to be processed (not shown) is supplied to screw space 3.

Gases emitted by the material flow outside through openings 11, 12 in housing 1. Said openings can e.g. also be provided in inside core 2 if it is of hollow design.

Shafts 4 extend in the area located outside openings 9, 11, 12 over a length corresponding e.g. to twenty times outside diameter D of screw elements 6.

Figure 3:
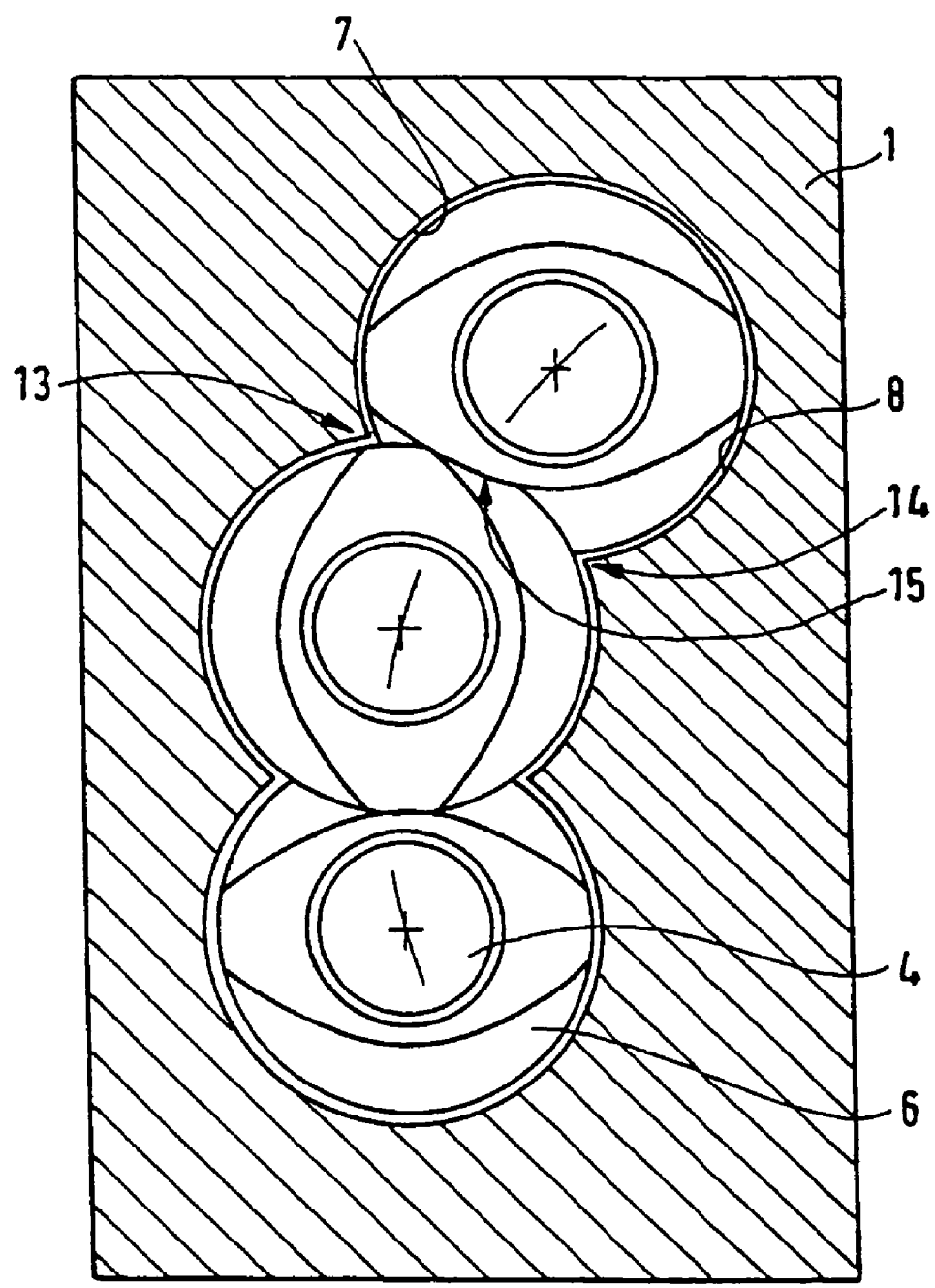
FIG. 3 shows a cross section through a further embodiment of the apparatus with three shafts with intermeshing screw elements in a circular arc-shaped screw space in the housing.
Figure 4:
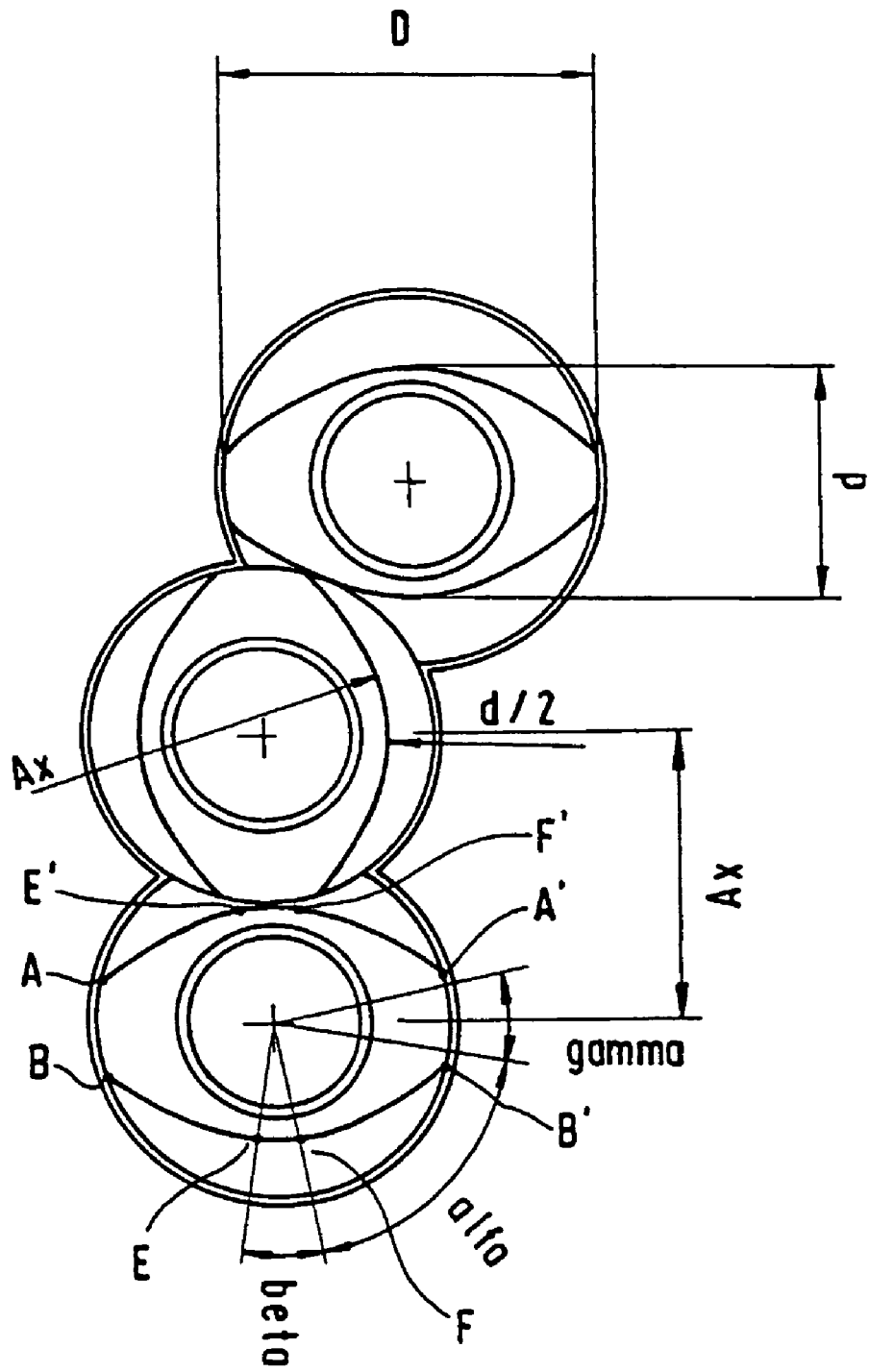
FIG. 4 shows a view corresponding to FIG. 3 without the housing.

According to FIGS. 2, 3 and 4, screw elements 6 have an elliptical contour in cross section having in the area of arcs A, B and A', B' a curvature corresponding to D/2, and in area E, F and E', F' a curvature corresponding to $A_x - \frac{1}{2} D$, where $A_x$ signifies the axial distance between two shafts. Angles $\alpha$, $\beta$ and $\gamma$, the curvatures of the areas between B and E, F and B' and A, E' and F', A' can be determined by well-known methods of analytic geometry, as described in EP 0 002 131 B1.

According to FIG. 2, the apparatus has through the twelve shafts 4 altogether 24 wedges 13, 14 or transitions where concave circular segments 7 on the inside of housing 1 and concave circular segments 8 on the outside of screw space 3 intersect. Between the two transitions 13, 14 there are zones 15 where screw elements 6 of adjacent shafts 4 intermesh tightly. At a pitch of ½ D altogether 960 intermeshing zones 15 are thus formed on screw length L composed of screw lengths L1 between material supply opening 9 and degassing opening 11, screw length L2 between the two degassing openings 11 and 12, and screw length L3 between degassing opening 12 and the material-discharge end of shafts 4, with L=20 D.

Figure 5:
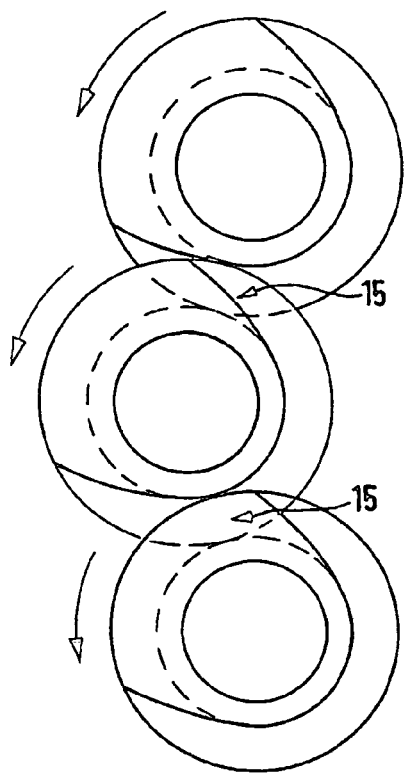
FIG. 5 shows a view corresponding to FIG. 4 but with three single-flighted screw elements.
Figure 6:
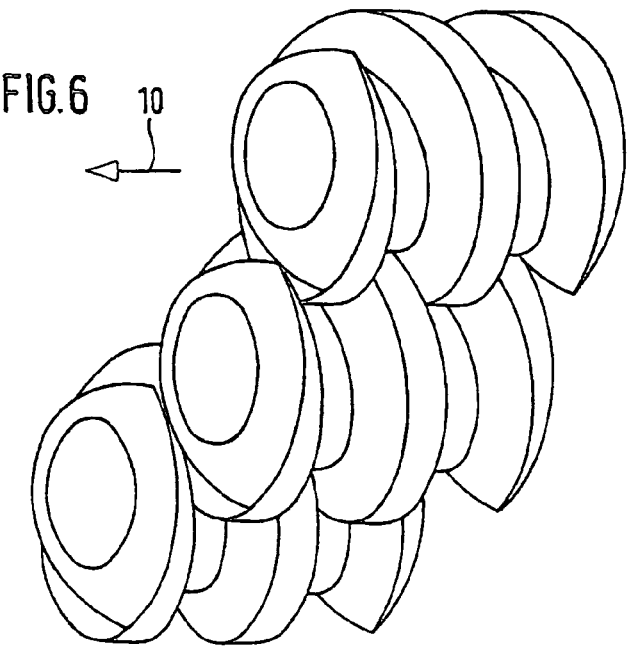

The effect of intermeshing zones 15 on the dispersion and homogenization of a solid or the other substance fractions in a viscous matrix is explained in more detail with reference to FIGS. 5 to 7, which show three intermeshing single-flighted screw elements with pitch S. The screw conveying direction is rendered by arrow 10. For the (right-handed) screws to convey according to arrow 10, they have the direction of rotation shown in FIG. 7.

Material moving in the direction of arrow 16 is exposed to the braking influence of housing 1 in the area of chamber 18 formed by concave circular segments 7 and 8 (FIG. 3). The effect of intermeshing zones 15 on the dispersion and homogenization of a solid or the other substance fractions in a viscous matrix is based substantially on said braking influence of housing 1 being substantially eliminated when material flows through intermeshing zones 15, which simultaneously involves an increase in material speeds and results in an extension of the involved material. Further, when material hits the outside diameter of flight K of receiving screw $6_{auf}$, said flight rotating at circumferential speed, the material is removed from the screw surface of delivering screw $6_{ab}$, reoriented and directed into the contracted cross section at 17 with a new flow direction, as in plowing. Via the viscosity of the continuous phase, this causes traction and bending forces to be exerted on the moistened solid agglomerates contained in the matrix so that they can break.

Figure 7:
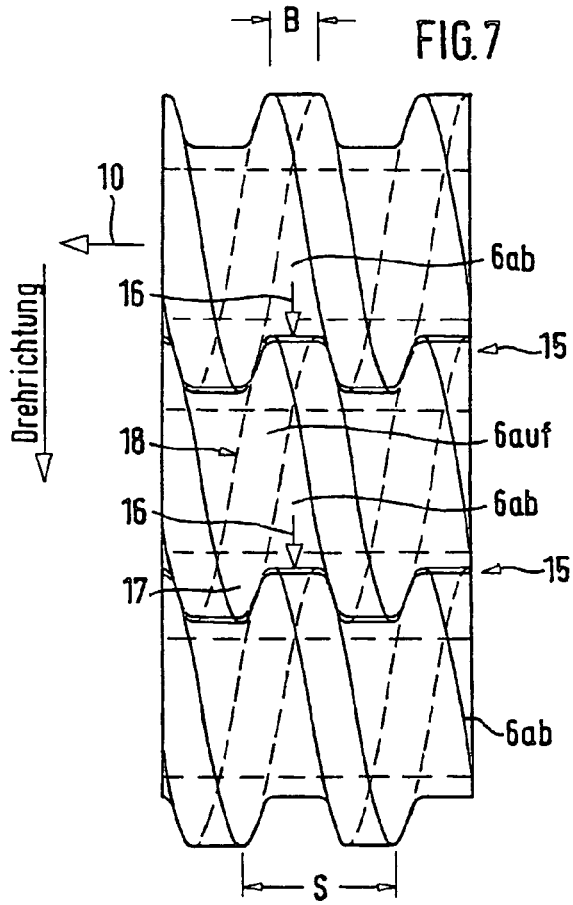
FIGS. 6 and 7 show a perspective view and plan view of the three screw elements according to FIG. 5.

FIG. 7 clearly indicates chamber 18, receiving side $6_{auf}$ being shown at the top and delivering side $6_{ab}$ at the bottom, with maximum possible flight width B. If B is made smaller, the receiving and delivering traversing surfaces simultaneously become larger and the transfer resistance thus smaller.

By changing flight width B one can thus influence the function. At an increase of pitch S, e.g. at twice the pitch, an increased or double throughput is obtained.

Figure 8:
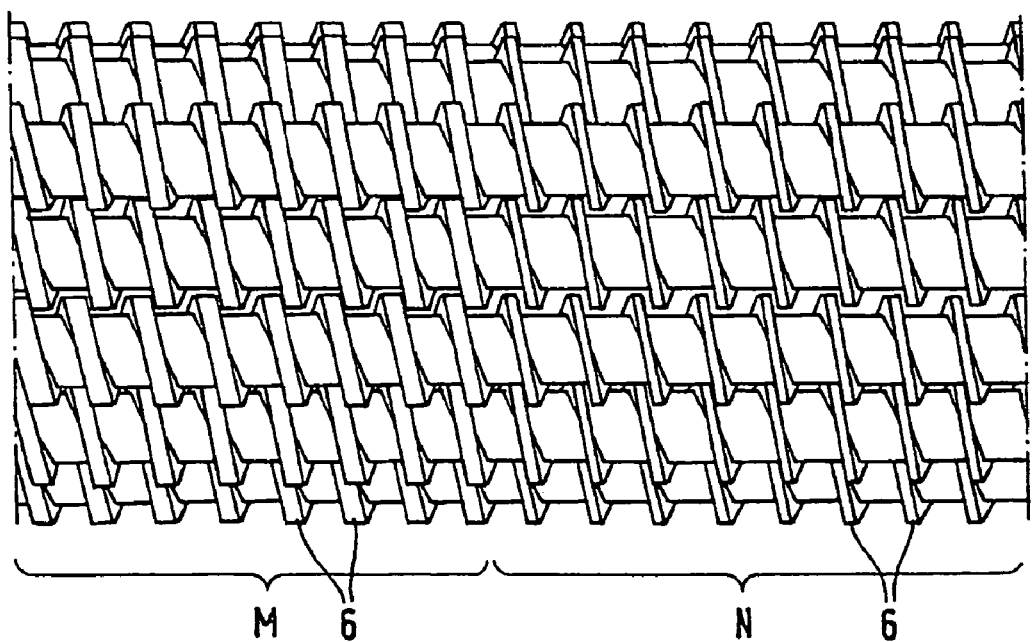
FIG. 8 shows a side view of the screw shafts corresponding to FIG. 1 but with single-flighted screw elements having flight widths of different size in different axial areas.

According to FIG. 8, single-flighted screw elements 6 have greater flight width K in axial area M of the apparatus than screw elements 6 in axial area N thereof. Screw elements 6 with greater flight width K can be disposed on the material output side and screw elements 6 with smaller flight width K on the material input side. However, it is also possible to dispose the screw elements with the greater flight width on the material input side and screw elements 6 with the smaller flight width on the material output side. Also, it is possible to provide axial areas with screw elements with greater flight width and axial areas with screw elements with small flight width alternately.

The flow resistance in the intermeshing zones can be controlled by the different flight width. The greater the flight width, the greater the resistance upon entering said zones.

EXAMPLE

An inventive apparatus with twelve shafts and a melt-filled process length of 23 D (D=outside diameter of screw elements), of which 10.5 D process length was equipped with a screw of ⅔ D pitch or less, was used to homogenize a polymer with 25 wt % carbon black. The formed pellets were subjected to optical measurement. An absolute dispersion was ascertained, at a particle size of <5 microns. This quality could hitherto be obtained only in a multistage method on a batch kneader.

The invention claimed is:

1. An apparatus for at least one of homogenizing and dispersing at least one viscous substance provided in combination with at least one solid or at least one other substance of different viscosity, having at least three axis-parallel rotatable shafts disposed in a screw space in a housing along a circle with equal central-angle distance and provided at least partly with tightly intermeshing screw elements, the housing being provided on the radially external and internal sides of the screw space with axis-parallel concave circular segments receiving the particular shaft and with openings into the screw space, wherein the shafts are provided in the area outside the openings over a length (L=L1+L2+L3) corresponding to at least ten times the outside screw diameter (D) of the screw elements with the screw elements having a pitch (S) of at most three quarters of the outside screw diameter (D) over a length of at least three times the outside diameter (D) of the screw elements.

2. The apparatus according to claim 1, wherein the pitch (S) is at most two thirds of the outside screw diameter (D).

3. The apparatus according to claim 1, wherein the screw elements are of single-flighted design.

4. The apparatus according to claim 3, wherein the flight width (K) of the screw elements is different in individual axial areas (M, N) at constant pitch (S).

5. The apparatus according to claim 1, wherein the screw elements have an elliptical contour in cross section, the curvature in the area of the major axis (A, B, A', B') corresponding to half the outside screw diameter (D) and in the area of the minor vertices (E, F, E', F') to the axial distance (Ax) of two said shafts minus half the outside screw diameter (D).

6. The apparatus according to claim 1, wherein said shafts are rotatable in the same direction.

7. The apparatus according to claim 1, wherein said apparatus is free from kneading blocks.

8. The apparatus according to claim 1, wherein said screw elements extend along the length of the entire portion of each said rotatable shaft that processes the viscous substance in combination with the at least one solid or the at least one other substance of different viscosity.

9. An apparatus for homogenizing and dispersing a viscous substance and at least one of solids and another viscous substance of different viscosity, comprising:
a cylindrical housing, including axial parallel concave circular segments defined by wedges therebetween, said cylindrical housing including a first opening at a first end for receiving the viscous substance and the at least one of solids and another viscous substance of different viscosity, and a second opening at a second output end;
an inside core in the housing including axis parallel concave circular segments defined by wedges therebetween, the inside core having the same number of corresponding axis parallel concave circular segments as the cylindrical housing, wherein the housing and inside core define an annular screw space; and
at least three axis-parallel rotatable shafts disposed in the annular screw space along a circle with equal central-angle distance, each said shaft received in corresponding ones of said concave circular segments of the housing and the inside core, the rotatable shafts being provided with tightly intermeshing screw elements having an outside screw diameter (D), the shafts having a length of at least ten times the outside screw diameter (D), the screw elements having a pitch (S) of at most three quarters of the outside screw diameter (D) over a length of at least three times the outside screw diameter (D),
wherein said rotatable shafts are rotated in the same direction and said apparatus is free of kneading blocks.

10. An apparatus according to claim 9, wherein the screw elements extend along the length of the entire portion of each said rotatable shaft that processes the viscous substance and the at least one of solids and another viscous substance of different viscosity.

11. An apparatus according to claim 9, wherein the screw elements have a pitch of at most one half of the outside screw diameter (D) and the screw elements extend along the entire length of each said rotatable shaft that processes the viscous substance and the at least one of solids and another viscous substance of different viscosity.

12. The apparatus according to claim 9, wherein the shafts have a length of at least fifteen times the outside screw diameter (D).

13. The apparatus of claim 9, wherein the screw elements are of single-flight design.

14. The apparatus according to claim 9, wherein the flight width of the screw elements is different in individual axial areas (M, N) having a constant pitch (S).

15. An apparatus for homogenizing and dispersing a viscous substance and at least one of solids and another viscous substance of different viscosity, comprising:
a cylindrical housing, including axial parallel concave segments defined by wedges therebetween, said cylindrical housing including a first opening at a first end for receiving the viscous substance and the at least one of solids and another viscous substance of different viscosity, and a second opening at a second output end;
an elongate inside core in the housing including axis parallel concave segments defined by wedges therebetween, the inside core having the same number of axis parallel concave segments as the cylindrical housing, wherein the housing and inside core define an annular screw space extending about the inside core; and
at least three axis-parallel rotatable shafts disposed in the annular screw space along a circle with equal central-angle distance, each said shaft received in corresponding ones of said concave circular segments of the housing and the inner core, the rotatable shafts being provided with tightly intermeshing screw elements having an outside screw diameter (D), the shafts having a length of at least ten times the outside screw diameter (D), the screw elements all having a pitch (S) of at most three quarters of the outside screw diameter (D), the screw elements extending along the length of the entire portion of each said rotatable shaft that processes the viscous substance and the at least one of solids and another viscous substance of different viscosity,
wherein said shafts are rotated in the same direction.

16. The apparatus according to claim 15, wherein said apparatus is free of kneading blocks.

17. The apparatus according to claim 16, wherein the screw elements are of single-flight design and have an elliptical contour in cross section, the curvature in the area of the major axis corresponding to half the outside screw diameter (D) and in the area of the minor vertices to the axial distance of two said shafts minus half the outside screw diameter (D).

18. The apparatus according to claim 16, wherein the flight width of the screw elements is different in individual axial areas (M, N) having a constant pitch (S).

* * * * *